(12) United States Patent
Lung et al.

(10) Patent No.: US 6,463,806 B1
(45) Date of Patent: Oct. 15, 2002

(54) INSTALLATION FOR MEASURING PRESSURE INSIDE VACUUM PIPELINE

(75) Inventors: Shing-Juh Lung, Hsinchu; Ze-You Lin, Miao-Li Hsien; Lee-Forng Yen, Chang-Hua, all of (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/440,905

(22) Filed: Nov. 16, 1999

(30) Foreign Application Priority Data

Sep. 9, 1999 (TW) ........................... 88115535 A

(51) Int. Cl.⁷ ............................................... G01L 7/00
(52) U.S. Cl. ........................................................ 73/756
(58) Field of Search ..................... 73/756, 714; 137/14, 137/205, 208, 209, 565.17, 565.23, 565.33, 557, 587

(56) References Cited

U.S. PATENT DOCUMENTS 6,116,260 A * 9/2000 Nakagawa et al. ........... 137/14

* cited by examiner

*Primary Examiner*—William Oen
(74) *Attorney, Agent, or Firm*—J.C. Patents

(57) ABSTRACT

An installation for measuring pressure along a pipeline. The installation includes a control valve between a vacuum gauge and a pipe section attached to the pipeline. Relying on open and close signals from a main valve, the control valve is opened and closed accordingly. The control valve is shut when the reaction chamber of a processing station is undergoing an operation. Since volatile emission from the chamber is prevented from reaching the interior surface of the vacuum gauge to form a coated layer, shifting of measured pressure is avoided and working life of the vacuum gauge is extended.

13 Claims, 3 Drawing Sheets

INSTALLATION FOR MEASURING PRESSURE INSIDE VACUUM PIPELINE

CROSS-REFERENCE TO RELATED APPLICATION

This application claims the priority benefit of Taiwan application serial no. 88115535, filed Sep. 9, 1999.

BACKGROUND OF THE INVENTION

1. Field of the Invention

The present invention relates to an installation for measuring pressure inside a vacuum pipeline. More particularly, the present invention relates to an installation that utilizes a control valve to protect a vacuum gauge.

2. Description of the Related Art

FIG. 1 is a schematic diagram showing a conventional vacuum pipeline system with connection to a vacuum gauge. A Tel Alpha-8S-Z furnace station 10 works in a high vacuum. In operation, some exhaust gases are produced inside the reaction chamber of the station 10. A vacuum pipeline is used to remove the exhaust gases from the reaction chamber 20. The exhaust gases pass through a trap 30. The trap 30 is a device for removing some of the micro-particles produced inside the reaction chamber 20. The exhaust gases subsequently pass through a main valve (MV) 40 to be drawn away by a pump 50. A vacuum gauge 60 is installed somewhere (at point A) along a pipeline section between the trap 30 and the main valve 40. The vacuum gauge is a device for measuring pressure in the reaction chamber 20 and along the pipeline.

As soon as a high vacuum is created inside the reaction chamber 20 of the station 10 using the pump 50, desired chemical reactions can be carried out inside the reaction chamber 20. However, the vacuum gauge 60 is mounted directly at some point along the pipeline. Since volatile substance from the reaction chamber 20 is carried along the pipeline, a portion of the substance is deposited on the cooler interior surface of the vacuum gauge 60. After the vacuum gauge 60 has been in use for some time, it is coated with a thick residual layer, leading to a shifting of the measured pressure. If the coated layer is thick, sometimes a value of just 720 torrs or lower is shown when the actual pipeline pressure is about one atmosphere (760 torr). An erroneous pressure from a faulty vacuum gauge is likely to compromise pressure control capability. Hence, product quality may be affected. Another effect on the vacuum gauge 60 due to the accumulation of emission material from the reaction chamber is a shortening of working life. Ultimately, frequency of maintenance of the station 10 has to increase resulting in a reduction of production efficiency.

According to repeated trials, a vacuum gauge is mounted directly onto the vacuum pipeline can have a working life of at most 3 months. For a production facility having many stations, maintaining all the vacuum gauges in proper working conditions is a daunting task and is very expensive.

SUMMARY OF THE INVENTION

Accordingly, one object of the present invention is to provide an installation for measuring pressure inside a vacuum pipeline that couples to a reaction chamber. The installation includes a control valve between the pipeline and a vacuum gauge. The vacuum gauge is shut when chemical reactions are conducted inside the reaction chamber so that material emitted from the reaction chamber is prevented from coating the interior surface of the vacuum gauge.

A second object of the invention is to provide an installation for measuring pressure inside a vacuum pipeline capable of preventing a gradual shifting of the measured pressure relative to the actual value. Hence, working life of the vacuum gauge is increased.

The invention provides an installation for measuring pressure inside a vacuum pipeline. The installation includes a pipe section, a control valve, a vacuum gauge and a control circuit. The pipe section branches from the pipeline, creating a separate path. The control valve is attached to the other end of the pipe section for opening and closing the pipe section. The vacuum gauge is connected to the control valve for measuring the pressure inside the pipeline when the control valve is opened. The control circuit is coupled between the control valve and a control device on a main valve. The control circuit shuts the control valve a preset period after the main valve is opened and opens the control valve immediately after the main valve is shut.

Through the opening and closing of a control valve using a control circuit, the coating of emission material onto the interior surface of the vacuum gauge is prevented. Consequently, working life of the vacuum gauge is extended.

This invention provides a vacuum pipeline installation that connects between a processing station and a pump for measuring pressure. The installation includes a vacuum pipeline, a pipe section, a control valve, a vacuum gauge and a control circuit. The input end of the trap is connected to the processing station. One end of the vacuum pipeline is connected to the output end of the trap. The input end of the main valve is connected to the other end of the pipeline, while the output end of the main valve is connected to the pump. One end of a pipe section is attached to a point somewhere along the pipeline between the trap and the main valve so that a branch from the pipeline is formed. One end of a control valve is connected to the other end of the pipe section for opening and closing the pipe section. The vacuum gauge is connected to the other end of the control valve for measuring pressure along the pipeline when the control valve is opened. The control circuit is coupled between the main valve and the control valve. The control circuit shuts the control valve a preset period after the main valve is opened and opens the control valve immediately after the main valve is shut.

This invention also provides a vacuum pipeline system. The system includes a processing station having a reaction chamber, a vacuum pipeline, a pipe section, a control valve, a vacuum gauge, a control circuit and a pump. The input end of the trap is connected to the processing station, and the output end of the trap is connected to one end of the vacuum pipeline. The input end of the main valve is connected to the other end of the pipeline, while the output end of the main valve is connected to the pump. One end of a pipe section is connected to a point somewhere along the pipeline between the trap and the main valve so that a branch from the pipeline is formed. One end of a control valve is connected to the other end of the pipe section for opening and closing the pipe section. The vacuum gauge is connected to the other end of the control valve for measuring pressure along the pipeline when the control valve is opened. The control circuit is coupled between the main valve and the control valve. The control circuit shuts the control valve a preset period after the main valve is opened and opens the control valve immediately after the main valve is shut.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
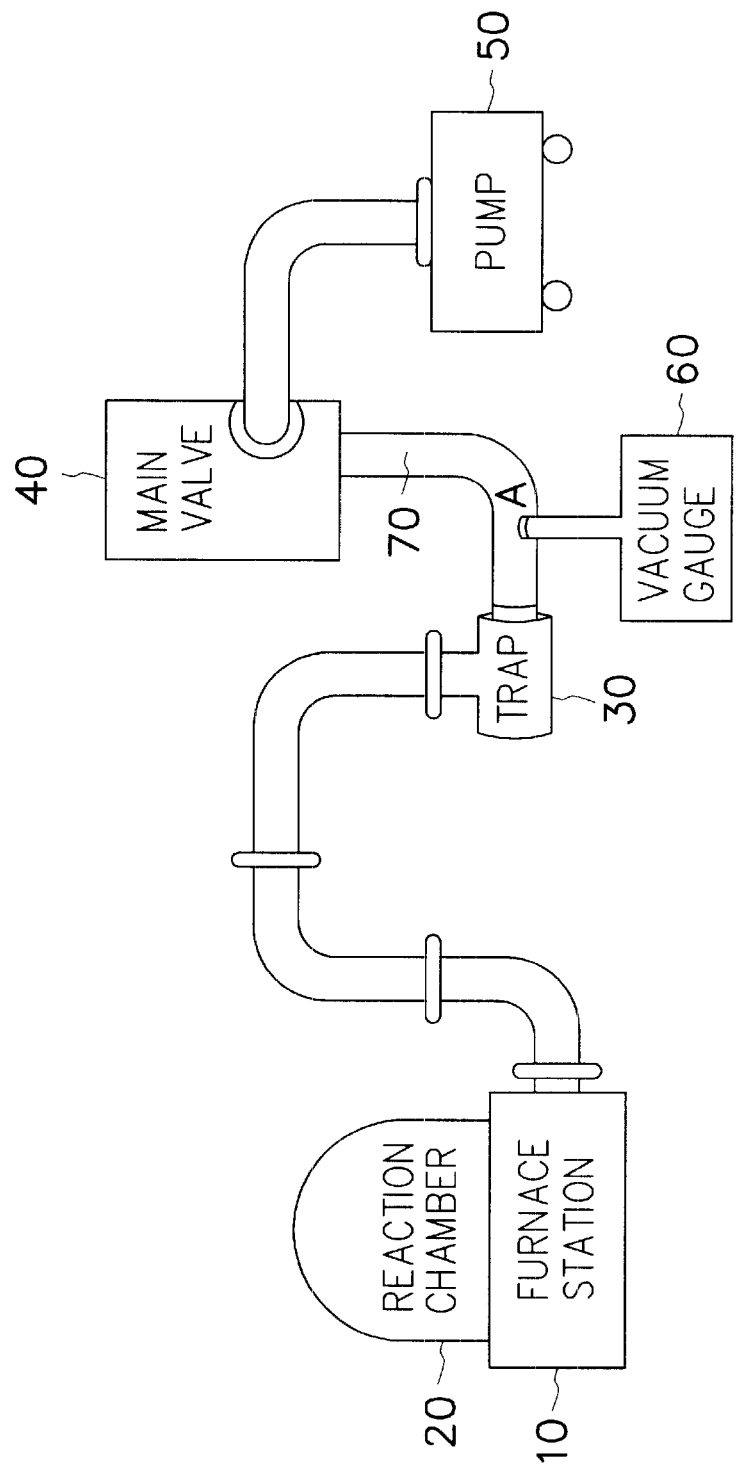
FIG. 1 is a schematic diagram showing a conventional vacuum pipeline system with connection to a vacuum gauge.

Reference will now be made in detail to the present preferred embodiments of the invention, examples of which are illustrated in the accompanying drawings. Wherever possible, the same reference numbers are used in the drawings and the description to refer to the same or like parts.

Figure 2:
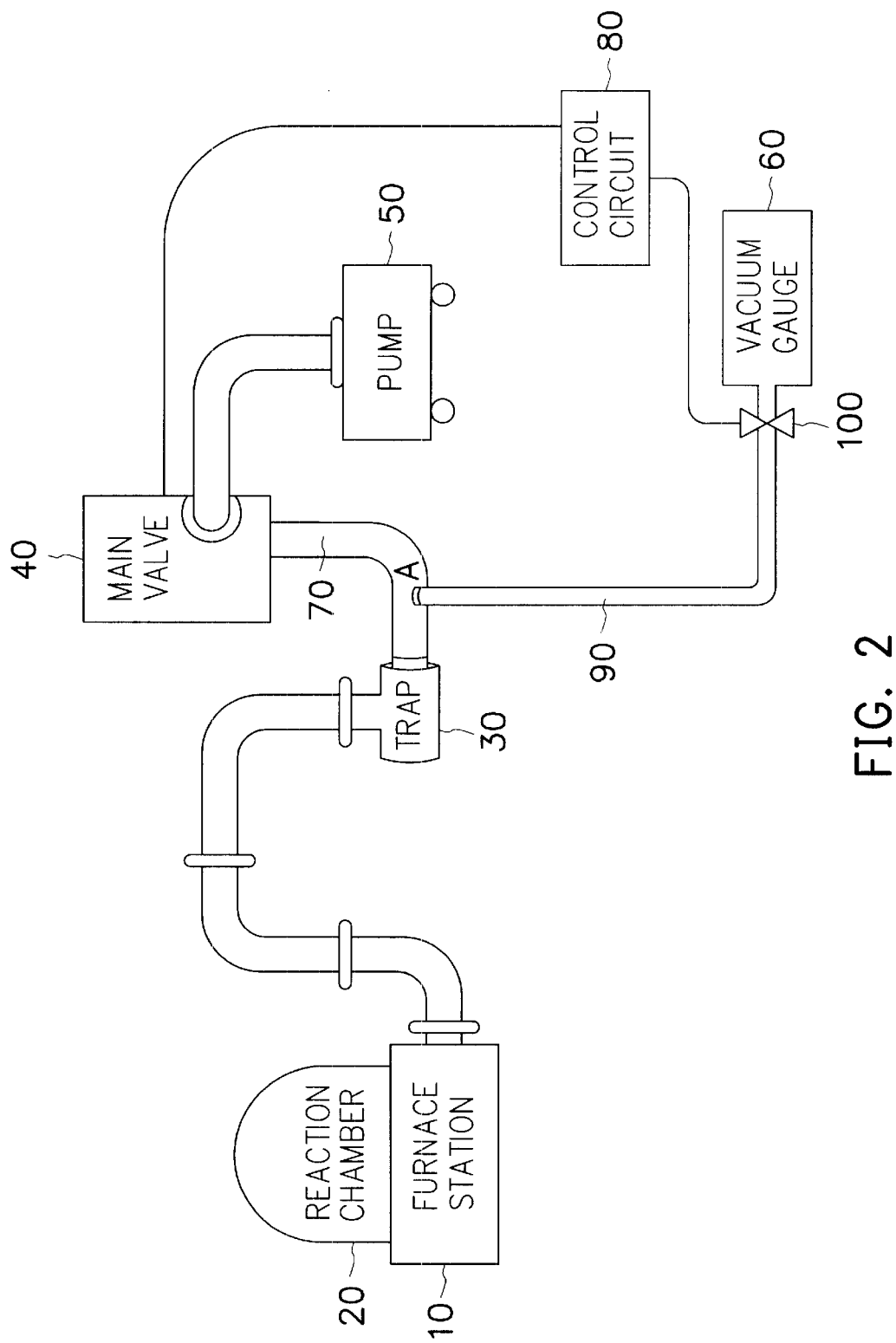
FIG. 2 is a schematic diagram showing a vacuum pipeline system according to this invention.

FIG. 2 is a schematic diagram showing a vacuum pipeline system according to this invention. As shown in FIG. 2, a Tel Alpha-8S-Z furnace station 10 is connected to the input end of a trap 30. A pipeline 70 connects the trap 30 and a main valve 40. A pump 50 is connected to the main valve 40 for pumping gases away from a reaction chamber 20 so that a high vacuum state is established.

One end of a pipe section 90 is connected to the pipeline 70 at point A, forming a branch. One end of a control valve 100 is connected to the other end of the pipe section 90 for opening and shutting the pipe section 90. A vacuum gauge 60 is connected to the other end of the control valve 100. The vacuum gauge 60 is used for measuring pressure inside the reaction chamber 20 and along the pipeline 70 when the control valve 100 is opened. A control circuit 80 is formed between the main valve 40 and the control valve 100. The control circuit 80 opens and closes the control valve 100 according to the opening or closed state of the main valve 40.

The vacuum gauge 60 within the system is capable of measuring pressure ranging from 5 torrs to 1 atm (760 torrs). In fact, the vacuum gauge 60 is a device mainly for measuring the pressure within the pipeline during a first stage vacuum pumping. As soon as pressure of the vacuum pipeline system drops to below 5 torrs, other types of finer vacuum gauges have to be used in the measurement of pressure within the pipeline 70 and inside the reaction chamber 20. Alternatively, the vacuum gauge 60 can be used for measuring the pressure inside the pipeline 70 and the reaction chamber 20 when the high vacuum state is relieved and pressure raised to a level over 5 torrs.

To reduce the accumulation of gaseous emission product on the interior surface of the vacuum gauge when the reaction chamber is operating in a high vacuum state, a vacuum pipeline system having an additional control valve 100 and a control circuit 80 that couples the control valve 100 and the main valve 40 is provided. When pressure inside the pipeline drops below 5 torrs, the main valve 40 opens and the pump 50 now serves as a second stage vacuum pump. As soon as the pressure drops below 5 torrs, the vacuum gauge 60 is no longer within its measurable range. Hence, the control valve 100 can be shut so that gaseous emission due to reaction in the reaction chamber 20 can no longer reach the gauge interior. On relieving the high vacuum state demanded for operation inside the reaction chamber 20, the main valve 40 is shut. The control valve 100 can be opened, permitting the vacuum gauge to resume pressure measurement.

According to the aforementioned arrangement, the control circuit 80 can be used to pick up an open signal from the main valve 40 when the main valve opens. After a preset period T, the control circuit 80 issues a shut signal to the control valve 100, shutting the control valve 100. In addition, the control circuit 80 can be used to pick up a shut signal from the main valve 40 when the main valve shuts. The control circuit 80 immediately issues an open signal to the control valve 100 opening the control valve 100.

Figure 3A:
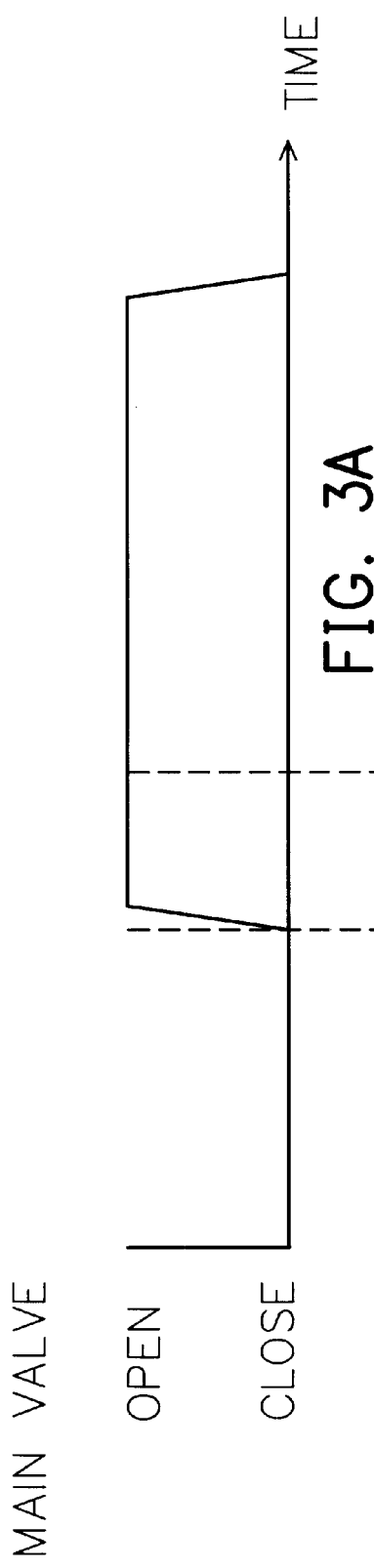
FIG. 3A and FIG. 3B are schematic diagrams showing the controlled opening and closing of the control valve relative to the main valve by the control circuit of this invention.
Figure 3B:
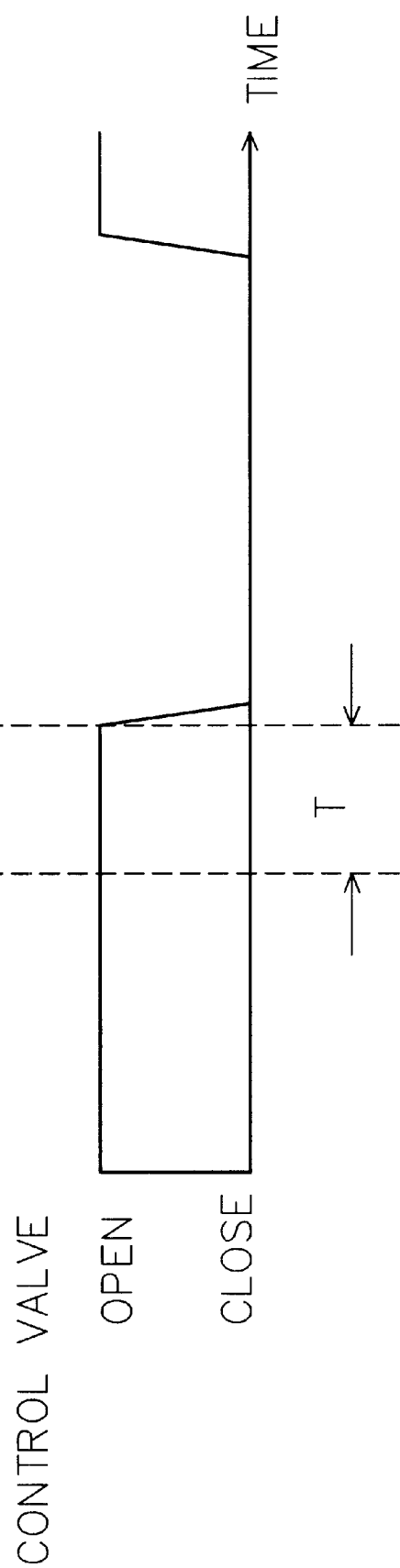

FIG. 3 is a schematic diagram showing the controlled opening and closing of the control valve relative to the main valve by the control circuit of this invention. The differential pressure between an opened and a closed control valve 100 is preferably within the permitted range of the vacuum gauge 60. Therefore, the pump 50 continues to pump an additional period T so that differential pressure both before the shutting of the control valve 100 and after the opening of the control valve 100 is reduced.

Due to special protection by the control valves 100, the vacuum gauge 60 is able to work from about three to five years. Consequently, the cost of replacing vacuum gauges in a large manufacturing facility can be greatly reduced.

In summary, one major advantage of this invention is the provision of a vacuum pipeline system having a control valve installed between a vacuum gauge and the pipeline. When a reaction is carried out inside the reaction chamber, the control valve can be shut so that the coating of emission material on the interior surface of the vacuum gauge is prevented.

A second advantage of this invention is the provision of a vacuum pipeline system capable of reducing the gradual shifting of vacuum gauge pressure. Thus, working life of a vacuum gauge is extended.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An installation attached to a pipeline between a trap and a main valve for pressure measurement, comprising:

a pipe section, having a first end and a second end, the first end being attached somewhere along the pipeline between the trap and the main valve, forming a branch from the pipeline;

a control valve, having a third end and a fourth end, the third end being connected to the second end of the pipe section for selectively opening and closing the pipe section;

a vacuum gauge connected to the fourth end of the control valve for measuring pressure inside the pipeline when the control valve is opened; and a control circuit coupled between the main valve and the control valve for shutting the control valve a preset period after the main valve is opened and opening the control valve immediately after the main valve is shut.

2. The installation of claim 1, wherein the control circuit receives a main valve open signal when the main valve opens, and sends out a shut signal to the control valve a preset period later.

3. The installation of claim 1, wherein the control circuit receives a main valve shut signal when the main valve shuts, and immediately sends out an open signal to the control valve.

4. The installation of claim 1, wherein the preset period is used for controlling a differential pressure before the control valve is shut and after the control valve is opened so that the differential pressure falls within a permitted range of the vacuum gauge.

5. An installation between a processing station and a pump for pressure measurement, comprising:
- a trap whose input end is connected to the processing station;
- a pipeline, one end of which is connected to the output end of the trap;
- a main valve whose input end is connected to another end of the pipeline and whose output end is connected to the pump;
- a pipe section, having a first end and second end, the first end being attached somewhere along the pipeline between the trap and the main valve, forming a branch from the pipeline;
- a control valve, having a third end and fourth end, the third end being connected to the second end of the pipe section for selectively opening and closing the pipe section;
- a vacuum gauge connected to the fourth end of the control valve for measuring pressure inside the pipeline when the control valve is opened; and
- a control circuit coupled to the main valve and the control valve, respectively, for shutting the control valve a preset period after the main valve is opened and opening the control valve immediately after the main valve is shut.

6. The installation of claim 5, wherein the control circuit receives a main valve open signal when the main valve opens, and sends out a shut signal to the control valve a preset period later.

7. The installation of claim 5, wherein the control circuit receives a main valve shut signal when the main valve shuts, and immediately sends out an open signal to the control valve.

8. The installation of claim 5, wherein the preset period is used for controlling a differential pressure before the control valve is shut and after the control valve is opened so that the differential pressure falls within a permitted range of the vacuum gauge.

9. An installation for pressure measurement, comprising:
- a processing station with a reaction chamber;
- a trap, whose input end is connected to the processing station;
- a pipeline, one end of which is connected to the output end of the trap;
- a main valve, whose input end is connected to another end of the pipeline;
- a pump, connected to an output end of the main valve, for pumping out gases within the reaction chamber;
- a pipe section, having a first end and a second end, the first end being attached somewhere along the pipeline between the trap and the main valve, forming a branch from the pipeline;
- a control valve, having a third end and a fourth end, the third end being connected to the second end of the pipe section for selectively opening and closing the pipe section;
- a vacuum gauge connected to the fourth end of the control valve for measuring pressure inside the pipeline when the control valve is opened; and
- a control circuit coupled to the main valve and the control valve, respectively, for shutting the control valve a preset period after the main valve is opened and opening the control valve immediately after the main valve is shut.

10. The installation of claim 9, wherein the processing station includes a Tel Alpha-8S-Z furnace station.

11. The installation of claim 9, wherein the control circuit receives a main valve open signal when the main valve opens, and sends out a shut signal to the control valve a preset period later.

12. The installation of claim 9, wherein the control circuit receives a main valve shut signal when the main valve shuts, and immediately sends out an open signal to the control valve.

13. The installation of claim 9, wherein the preset period is used for controlling a differential pressure before the control valve is shut and after the control valve is opened so that the differential pressure falls within a permitted range of the vacuum gauge.

* * * * *